United States Patent

Volkel et al.

[15] 3,701,006
[45] Oct. 24, 1972

[54] METHODS AND APPARATUS FOR MEASURING THE ELECTRICAL RESISTIVITY OF FLOWING DRILLING MUDS

[72] Inventors: George D. Volkel; Milton E. Cram, both of Houston, Tex.

[73] Assignee: Schlumberger Technology Corporation, New York, N.Y.

[22] Filed: Nov. 5, 1970

[21] Appl. No.: 87,037

[52] U.S. Cl. ................................. 324/30 R, 324/11
[51] Int. Cl. ................................................. G01n 27/42
[58] Field of Search ........... 324/30 R, 30 B, 64, 2, 10, 324/11

[56] References Cited

UNITED STATES PATENTS

| | | | |
|---|---|---|---|
| 2,922,103 | 1/1960 | Smith | 324/2 |
| 2,573,133 | 10/1951 | Greer | 324/1 |
| 3,056,919 | 10/1962 | Kuipers | 324/30 B |
| 2,599,413 | 6/1952 | Reichertz | 324/30 B |
| 3,115,602 | 12/1963 | Sutton | 324/64 |

FOREIGN PATENTS OR APPLICATIONS

| | | | |
|---|---|---|---|
| 243,946 | 1969 | U.S.S.R. | 324/30 B |

Primary Examiner—Michael J. Lynch
Attorney—Ernest R. Archambeau, Jr., Stewart F. Moore, David L. Moseley, Edward M. Roney and William R. Sherman

[57] ABSTRACT

As a representative embodiment of the invention disclosed herein, one or more electrical measuring devices are placed at selected locations in the drilling mud circulating system of a conventional drilling rig for accurately determining the resistivity of the drilling mud flowing past those locations. To obtain these measurements, electrical current is passed between spaced electrodes arranged in an electrically-isolated conduit that is disposed in a stream of the drilling mud. In one embodiment of the invention, new and improved means are provided for measuring all of the current passing between the electrodes regardless of the diverse paths which the current may follow. In an alternative embodiment of the invention, unique means are employed for assuring that all of the current passing between the electrodes will be only along specified paths within the electrically-isolated conduit so that a measurement of the current flowing along only of these specified paths will be sufficient for accurately determining the resistivity of the mud. New and improved thermally-responsive control means are also disclosed for converting the resistivity measurements obtained while practicing the present invention to resistivity measurements at a selected temperature.

15 Claims, 5 Drawing Figures

George D. Volkel
Milton E. Cram
INVENTORS

BY *J R Archambeau Jr.*

ATTORNEY

George D. Volkel
Milton E. Cram
INVENTORS

METHODS AND APPARATUS FOR MEASURING THE ELECTRICAL RESISTIVITY OF FLOWING DRILLING MUDS

Various proposals have, of course, been advanced heretofore for measuring the resistivity of the drilling mud entering and leaving a borehole during a typical drilling operation to determine various sub-surface conditions encountered by the drill bit. For example, in U.S. Pat. No. 2,396,420, it is proposed that the mud-circulation system include a pair of specially arranged vessels through which the outgoing and returning mud-circulating streams are respectively circulated. By coupling spaced electrodes arranged in each of these vessels into a typical Wheatstone bridge circuit, a measurement is presumably made of the resistance or resistivity of the mud flowing through each stream. Even if these measurements are assumed to be relatively accurate, test arrangements of this nature are not commercially favored since, among other things, special equipment must be added to what would otherwise be conventional mud-circulation systems. Moreover, unless special arrangements are made, these test devices will often give non-representative measurements from which undetected errors may well result.

To simplify the measurements as well as to eliminate the necessity for modifying the mud-circulation system, resistivity-measuring devices such as that shown in U.S. Pat. No. 3,422,674 have also been proposed. As disclosed in this patent, an insulated tube is positioned in a convenient location adjacent to the mud pit typically employed in a conventional mud-circulating system. In this manner, it is hoped that the resistivity measurements obtained from that portion of the mud stream flowing through the sampling tube will be representative of the true resistivity of the mud stream in that section of the circulating system. It has been found, however, that devices of this nature fail to accurately account for the effects of those portions of the mud stream bypassing the sampling tube.

Accordingly, it is an object of the present invention to provide new and improved methods and apparatus for measuring mud resistivity in such a manner that no special arrangements or modifications need be made in the mud-circulating system and without compromising the accuracy and reliability of the measurements.

This and other objects of the present invention are attained by passing an electrical current between spaced current electrodes arranged within an electrically-insulated conduit which is positioned in a stream of drilling mud; measuring a selected function representative of only the current flow between the spaced electrodes which passes through the drilling mud within the insulated conduit; and then determining from this selected function the electrical resistivity of the drilling mud.

In one embodiment of apparatus arranged in accordance with the principles of the present invention, first and second current electrodes are arranged at a selected spacing in an electrically-insulated conduit. Means including a first pair of spaced measuring electrodes in the insulated conduit between the current electrodes are provided for determining a first function representative of that portion of electrical current passing directly through the mud stream inside of the conduit. Means including a second pair of spaced measuring electrodes arranged in the insulated conduit at a selected distance beyond the other electrodes are provided for determining a second function representative of that portion of the current passing between the current electrodes and around the exterior of the conduit. Means are operatively arranged for converting these first and second functions to an accurate measurement of the true resistivity of the mud stream flowing past the insulated conduit.

In an alternative embodiment of the present invention, first, second and third current electrodes are arranged at spaced intervals along the interior of an electrically-insulated conduit. The first and third current electrodes are electrically interconnected to maintain them at the same potential so that all current flow must be through only the mud inside of the insulated conduit and between the first and third electrodes and the second current electrode therebetween. Since the current flow between the second electrode and the first and third current electrodes, respectively, will be divided in direct proportion to the respective spacings of the first and third electrodes from the second current electrode, it is necessary only to place a pair of measuring electrodes in the conduit between the second current electrode and either one of the first and third current electrodes to measure a function representative of the current flowing between the second electrode and either the first or the third electrode for determining the total current flow between the current electrodes. Means are operatively arranged for converting this measured function to an accurate measurement of the true resistivity of the mud stream flowing past the insulated conduit.

The novel features of the present invention are set forth with particularity in the appended claims. The invention, together with further objects and advantages thereof, may be best understood by way of the following description of exemplary methods and apparatus employing the principles of the invention as illustrated in the accompanying drawings, in which:

Figure 1:
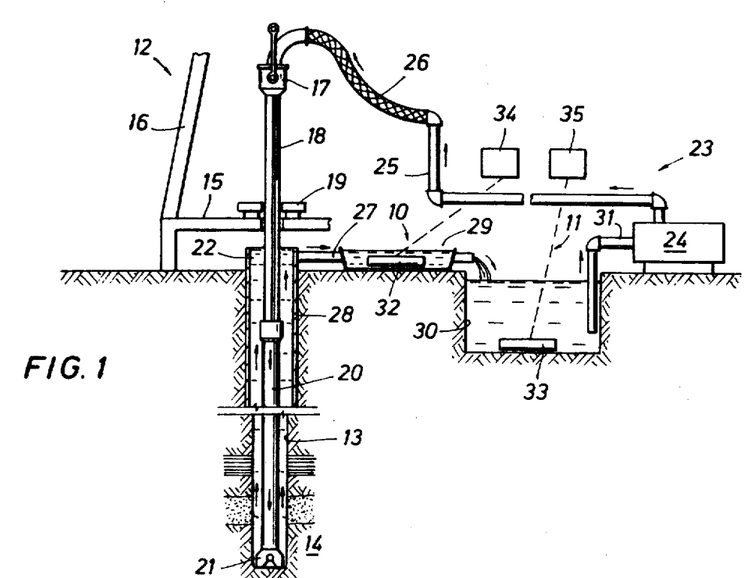
FIG. 1 schematically illustrates a portion of a typical rotary drilling rig and its associated mud-circulating system along with apparatus arranged in accordance with the present invention.

Turning now to FIG. 1, similar or identical resistivity-measuring systems 10 and 11 arranged in accordance with the present invention are schematically illustrated as they may be employed in conjunction with a conventional rotary-drilling operation in which a so-called "-drilling mud" is circulated. As is customary, the drilling operation is accomplished by means of a typical drilling rig 12 which is suitably arranged for drilling a borehole 13 through various earth formations, as at 14, until a desired depth is attained. The drilling rig 12 conventionally includes a drilling platform 15 carrying a derrick 16 which supports conventional cable-hoisting machinery (not shown) suitably arranged for supporting a swivel 17 and a tubular "kelly" 18. The drilling rig 12 further includes a rotary table 19 operatively arranged on the rig floor 15 for rotatively driving the kelly 18 which supports a dependently-coupled string 20 of tandemly connected joints of drill pipe and drill collars carrying a typical rotary drilling bit 21.

As is customary, the borehole 13 is filled with a supply of drilling mud 22 for maintaining pressure control of the various earth formations, as at 14; and, as indicated by the several arrows seen in FIG. 1, the drilling mud is continuously circulated between the surface and the bottom of the borehole during the course of the drilling operation for cooling the drill bit 21 as well as for carrying away cuttings as they are removed by the drill bit. To circulate the drilling mud, the drilling rig 12 further includes a mud-circulating system 23 which conventionally has a high-pressure circulating pump 24 coupled to the kelly 18 and the drill string 20 by means of suitable piping 25 and a flexible hose 26 connected to the swivel 17. The drilling mud is returned to the surface by way of a return line 27 coupled between the surface casing 28 typically lining the uppermost portions of the borehole 13 and an open-top trough 29 which is customarily arranged to discharge the returning drilling mud into one end of one or more serially-arranged tanks or a so-called "mud pit" 30. A section pipe 31 in the other end of the mud pit 30 is coupled to the pump 24 for withdrawing the drilling mud contained therein. Those skilled in the art will, of course, appreciate that selected treating and mud-conditioning agents are typically added to the mud pit 30 to regulate various physical and chemical properties of the drilling mud before it re-enters the borehole 13.

Accordingly, it will be appreciated that as the pump 24 is operated, the drilling mud is continuously pumped downwardly through the kelly 18 and the drill string 20 and then discharged from one or more ports in the drill bit 21 into the bottom of the borehole 13. As the drilling mud leaves the drill bit 21, the cuttings being removed thereby will be carried in suspension by the column of viscous mud returning to the surface by way of the annular space defined in the borehole 13 around the drill string 20.

It will, of course, be appreciated that as each incremental portion of drilling mud exits from the drill bit 21 and enters the borehole 13, the chemical and physical characteristics of this increment can be affected or changed for several reasons. For example, should the drill bit 21 be penetrating an earth formation containing salt water, entrance of the connate fluids into the borehole 13 will produce a commensurate increase in the salinity (and a corresponding decrease in electrical resistivity) of that portion of the drilling mud which is then exiting from the drill bit. Conversely, as the drill bit 21 penetrates a permeable formation having little or no connate water contained therein, the liquid phase of the drilling mud will invade the permeable formation and the solid particles carried in suspension in the drilling mud will be filtered out onto the exposed formation wall to form a so-called "mud cake". As a result, in the practice of the present invention, it has been noted at times that there is a net loss of chloride ions from those portions of the drilling mud which will cause corresponding increases in the electrical resistivity (and decreases in the salinity) of these incremental portions.

It should be noted that the drilling mud circulating through the borehole 13 can be considered to remain in a closely restricted stream, with the incoming mud being confined within the drill string 20 and the outgoing mud being confined in the annular space defined between the borehole wall and the exterior of the drill string. Experience has demonstrated, therefore, that there is little or no intermixing of the several incremental portions of drilling mud constituting either the incoming or outgoing mud streams in the borehole 13 even though there may be a localized area of agitation around the drill bit 21. As a result, most, if not all, of the changes in resistivity of the drilling mud can be generally attributed to some characteristic or property of the formation which is then being penetrated by the drill bit 21; and these changes can be reliably determined by making resistivity measurements at the surface of incremental portions of drilling mud successively entering and leaving the borehole 13.

Accordingly, as each incremental portion of the returning stream of drilling mud reaches the surface, measurements can be made to determine whether there has been a decrease or an increase of its electrical resistivity after that portion of the drilling mud entered the mud pump 24. Thus, by successively measuring the resistivity of the drilling mud entering and leaving the mud pit 30 to determine such increases and decreases in electrical resistivity, useful indications will be obtained of the nature of the earth formations, as at 14, as they are penetrated by the drill bit 21. It will, of course, be appreciated that appropriate corrections must be made to account for the time required for a given increment of drilling mud entering the mud pump 24 to subsequently return to the surface. Such corrections may, of course, be readily ascertained by those skilled in the art.

As previously mentioned, the resistivity-measuring devices of the prior art (such as those shown in U.S. Pat. Nos. 2,396,420 and 3,422,674) have been unsatisfactory for measuring the resistivity of flowing drilling muds with sufficient accuracy to reliably determine differences in the resistivity of a drilling mud entering and leaving a well bore. As shown in these patents, at least a substantial portion of the drilling mud in each stream is respectively passed through an elongated tube or vessel of an electrical insulating material having first and second pairs of coaxial electrodes spaced at longitudinal intervals along its interior wall. By connecting a source of electrical power across the first and last of these electrodes, it has been assumed heretofore that all of the electrical current will flow through the drilling mud passing through the tube so that a measurement of the potential difference between the second and third electrodes will provide an accurate determination of the true electrical resistivity of the drilling mud. Experiments have shown, however, that such measurements are generally inaccurate and, in many instances, even misleading. As a result of these experiments, it has been found that prior-art resistivity-measuring techniques and devices are simply incapable of accurately measuring the electrical resistivity of a flowing drilling mud as it enters and leaves a well bore.

Figure 2:
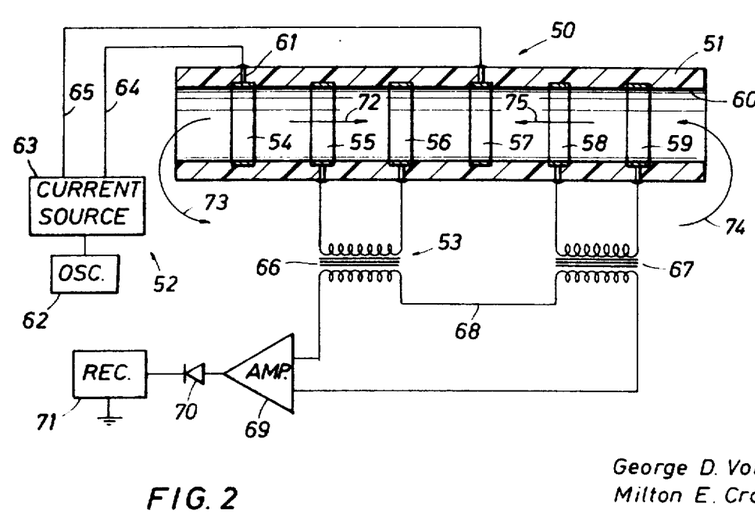
FIG. 2 schematically depicts one embodiment of apparatus arranged in accordance with the principles of the present invention.

Accordingly, in keeping with the objects of the present invention, new and improved apparatus is provided for accurately measuring the electrical resistivity of flowing drilling muds. In one manner of accomplishing this, new and improved resistivity-measuring apparatus 50 is arranged as depicted in FIG. 2 and includes an elongated, electrically-nonconductive tubular conduit 51 through which a flowing stream of drilling mud can be directed and be electrically isolated from exterior electrical conductors. Current-supply means 52 are operatively arranged for passing electrical current through a stream of drilling mud flowing through the tubular member 51; and electrical measuring means 53 are provided for obtaining measurements which, in response to the passage of electrical current therethrough, are representative of the electrical resistivity of this isolated stream of drilling mud.

As shown in FIG. 2, the tubular member 51 is either completely lined with or formed entirely of a suitable electrical insulating material such as an elastomer or a plastic material. In the preferred embodiment illustrated, the conduit 51 is constructed of epoxy-fiberglass. In any event, the tubular conduit 51 is cooperatively designed to preclude the flow or leakage of electrical current through the body of the elongated tube. Six electrically conductive members such as metal rings 54–59 are coaxially disposed within the interior bore 60 of the elongated tube 51 and spaced therealong at selected longitudinal intervals. In the preferred embodiment depicted in FIG. 2, each of the conductive members 54–59 is appropriately recessed into the interior wall of the conduit 51 to provide an unobstructed flow passage through the interior bore 60. Electrical contacts, as at 61, are respectively connected to each of the electrode rings 54–59 and carried through the wall of the tubular member 51 to provide convenient exterior terminals for the connection of electrical conductors.

The current-supply means 52 include a source of constant-amplitude, alternating current voltage, such as an oscillator 62 having a constant output frequency and followed by a voltage-controlled current source 63, which is operatively coupled by means of electrical conductors 64 and 65 to the first and fourth electrode rings 54 and 57 for passing electrical current of a constant frequency and amplitude through the isolated stream of drilling mud. Although the output frequency of the oscillator 62 is not critical and may be in the range of about 60 to 2,000-cycles/sec., it is preferred to use a frequency of about 1,000 -cycles/sec. to minimize interference from random electrical noise sources.

In the preferred embodiment of the measuring means 53, the primary windings of a pair of similar or identical transformers 66 and 67 are respectively connected to the second and third electrodes 55 and 56 and the fifth and sixth electrodes 58 and 59 in the conduit 51. One end of the secondary winding of the transformer 66 is connected by an electrical conductor 68 to the adjacent end of the secondary winding of the transformer 67 and the other ends of their secondary windings are respectively connected to the input terminals of a typical amplifier 69. The output of the amplifier 69 is, in turn, coupled by means of a detector, such as a diode 70 to the input terminals of a typical recording device 71.

It will, of course, be appreciated that to practice the present invention in conjunction with the operation of the drilling rig 12, a pair of the measuring tubes 51 would be positioned in the mud-circulation system 23 at, for example, the locations designated at 32 and 33 in FIG. 1. However as indicated in FIG. 2, irrespective of the particular location of the measuring tube 51, where the tube is at least partially immersed in a flowing stream of drilling mud, operation of the current-supply means 52 will develop a potential difference across the electrodes 54 and 57. A significant, if not a major, portion of this current flow will, as indicated by the arrow 72 in FIG. 2, be directly through the drilling mud flowing through the intermediate portion of the internal bore 60 of the insulated conduit 51. On the other hand, it has been found that there is also a significant current flow between the electrodes 54 and 57 which, as schematically shown by the arrows 73–75, will follow one or more indeterminable and indirect paths or loops around the exterior of the conduit 51 as well as through the drilling mud flowing within the opposite end portions of the measuring tube. Stated another way, it has been found that when current is applied to the current electrodes 54 and 57, the current will divide, with a first portion thereof (as shown by the arrow 72) flowing directly from one current electrode to the other by way of the drilling mud passing through the intermediate section of the interior bore 60 of the insulated tube 51. As represented by the arrows 73–75, a second portion of this current flow will pass out of one end of the tube 51 from one of the current electrodes 54–57, flow around the exterior of the measuring tube, and re-enter the opposite end of the tube to reach the other current electrode. It will be appreciated, however, that the degree of division of the total current flow between the electrodes 54 and 57 will be wholly dependent upon the total electrical resistance of the one or more paths which are taken by that portion of the current flowing exteriorly of the measuring conduit 51. Thus, if, for example, the insulated tube 51 is lying in a metal mud trough, as at 29, a significant portion of the total current flow could well be through the metal of the trough. Other extrinsic factors such as caked mud on the bottom of the mud trough 29 will influence the magnitude of electrical current which will flow around the measuring tube 51. Such extrinsic factors are, of course, impossible to determine with certainty.

Accordingly, in keeping with the principles of the present invention, the measuring means 53 are cooperatively arranged to measure a function which is representative of only the resistivity of the drilling mud passing through the tube 51. To accomplish this, the measuring electrodes 55 and 56 are preferably spaced apart a distance which is equal to the spacing between the measuring electrodes 58 and 59. The potential differences across the electrodes 55 and 56 and the electrodes 58 and 59 are respectively measured; and, by adding the two voltages together, the resistance of the drilling mud flowing between the measuring electrodes 55 and 56 can be accurately determined. Then, since the cross-sectional area of the insulated tube 51 and the spacing between the electrodes 55 and 56 are known, the resistivity of the drilling mud can be readily determined.

The mathematical basis for the new and improved methods and apparatus of the present invention will best demonstrate the accuracy of the measurements which can be attained by means of the apparatus shown in FIG. 2. First of all, as pointed out above, the total current ($I_o$) flowing between the current electrodes 54 and 57 will be divided with a portion thereof, $\alpha I_o$, flowing along the path indicated by the arrow 72 and the remaining portion thereof, $[1-\alpha]I_o$, flowing along the path indicated by the arrows 73-75. The potential difference, $E_1$, across the first measuring electrodes 55 and 56 will, therefore, be:

$$E_1 = R_1(\alpha I_o) \qquad \text{Eq. 1}$$

where, $\alpha I_o$ is the fraction of the total current flow passing the measuring electrodes 55 and 56, and $R_1$ is the resistance of the mud flowing between the first measuring electrodes 55 and 56.

Similarly, the potential differences, $E_2$, across the second measuring electrodes 58 and 59 is expressed as:

$$E_2 = R_2(1-\alpha)I_o \qquad \text{Eq. 2}$$

where, $(1-\alpha)I_o$ is the fraction of the total current flow passing around the tube 51 and passing the electrodes 58 and 59, and $R_2$ is the resistance of the mud flowing between the second measuring electrodes 58 and 59.

By selectively arranging the longitudinal spacing between the electrodes 58 and 59, it will be appreciated that the resistances of the drilling mud flowing between each pair of the measuring electrodes can be assumed to be equal. In other words, $R_1$ is equal to $R_2$. Thus, by setting $R_2$ to equal $R_1$ and adding Equations 1 and 2, $$E_1 + E_2 = R_1(\alpha I_o) + R_1(1-\alpha)I_o = R_1 I_o \qquad \text{Eq. 3}$$

It will be appreciated, therefore, that Equation 3 is independent of the actual division of current flow as represented by the expression $\alpha$ in Equations 1 and 2. Thus, the measuring means 53 of the present invention are adapted to add the potential differences appearing at any given time across the two sets of measuring electrodes 55 and 56 and the electrodes 58 and 59 to provide an output to the recorder 71 that is a function of only the resistance $R_1$ since the current output $I_o$ is always at a selected constant value. As previously mentioned, since the cross-sectional area of the tube 51 and the longitudinal spacing between the electrodes 55 and 56 are constants, the resistance $R_1$ can be readily converted to obtain the electrical resistivity of the drilling mud flowing through the tubular member. The recorder 71 can, therefore, be readily adapted so that its output readings directly express the resistivity of the mud.

It should be noted that although it is preferred that the spacing between the electrodes 55 and 56 be equal to the spacing between the electrodes 58 and 59, each pair of the measuring electrodes could be unequally spaced if appropriate compensations are made in the electronic circuitry of the measuring means 53. For example, if the spacing between the first measuring electrodes 55 and 56 is twice that for the second measuring electrodes 58 and 59, $R_1$ and $E_1$ would be doubled in relation to $R_2$ and $E_2$. Thus, the primary-to-secondary ratio of the transformer 66 could be readily selected to provide a compensated output voltage which could be correctly added to the output of the transformer 67 to satisfy Equation 3.

Figure 3:
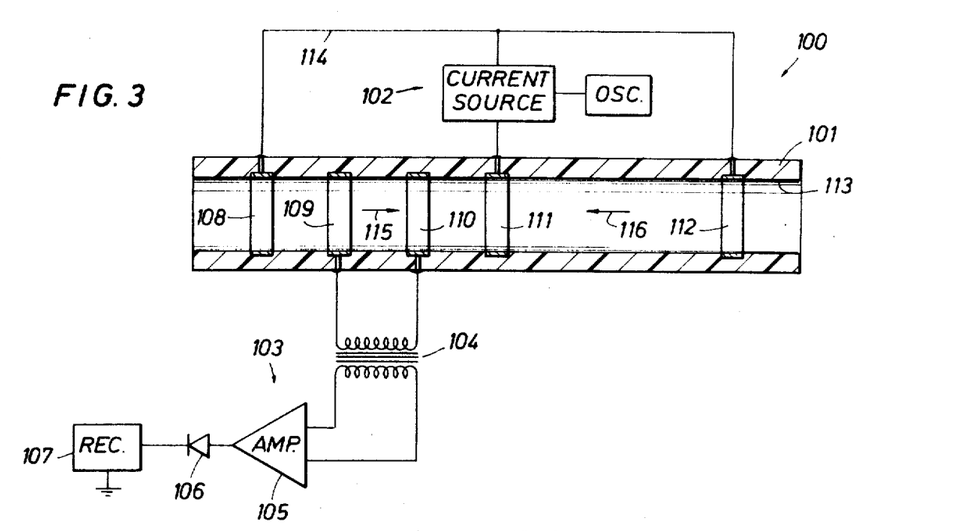
FIG. 3 shows an alternative embodiment of apparatus also arranged in accordance with the principles of the present invention.

Turning now to FIG. 3, an alternative embodiment is depicted of resistivity-measuring apparatus 100 which is also arranged in accordance with the present invention. As illustrated, this new and improved apparatus 100 includes an elongated, electrically nonconductive tubular conduit 101 which is cooperatively arranged to electrically isolate a stream of drilling mud flowing therethrough from the surrounding environment exterior of the tube. The measuring tube 101 is either formed entirely of a suitable electrical insulating material or else it is completely lined with a suitable electrical insulating material in a fashion similar to the conduit 51.

As was the case with the resistivity-measuring apparatus 50 depicted in FIG. 2, the resistivity-measuring apparatus 100 similarly includes current-supply means 102 and electrical-measuring means 103 which are cooperatively arranged for determining the electrical resistivity of a stream of drilling mud flowing through the tube 101. It will, of course, be recognized that the current-supply means 102 are similar or identical to the current-supply means 52 as previously described. For reasons that will subsequently be discussed, the electrical-measuring means 103 has only a single coupling transformer 104 coupled to the input terminals of an amplifier 105 which is, in turn, coupled by means of a detector or diode 106 to a recorder 107.

The resistivity-measuring apparatus 100, however, employs an electrode arrangement for the insulated conduit 101 which differs from that used for the apparatus 50. As shown in FIG. 3, five electrically-conductive members or metal rings 108-112 are coaxially disposed within the interior bore 113 of the tube 101 and spaced therealong at selected longitudinal intervals. It will be noted that in the preferred embodiment of the apparatus 100, the longitudinal spacing between the first and fourth electrodes 108 and 111 is equal to the longitudinal spacing between the fourth electrode and the fifth electrode 112. As a further distinction, the first and fifth electrodes 108 and 112 are interconnected by a common electrical conductor 114 and the current-supply means 102 are coupled between this conductor and the fourth electrode 111.

It will be appreciated, therefore, that since they are interconnected, the first and fifth electrodes 108 and 112 will be at the same electrical potential and the current flow from the current-supply means 102 will be between these two electrodes and the fourth electrode 111. Moreover, since there is no potential difference between the first and fifth electrodes, there will be no current flowing exteriorly of the conduit 101; and, as indicated by the arrows 115 and 116, the entire current output of the current-supply means 102 must pass through the mud stream flowing through the insulated conduit between the electrodes 108 and 112 and the electrode 111 disposed therebetween.

Since the intermediately located current electrode 111 is spaced equally between the two outwardly-located current electrodes 108 and 112 in the preferred embodiment of the apparatus 100, the current output of the current-supply means 102 will be equally divided with half of the current flow being between each of the outward electrodes, respectively, and the intermediate electrode. Accordingly, it is necessary to place only a single pair of measuring electrodes 109 and 110 between the intermediate current electrode 111 and either one of the outwardly-located electrodes 108 and 112 for measuring the potential difference across the two measuring electrodes and thereby accurately determining the electrical resistivity of the drilling mud flowing through the insulated conduit 101.

It will, of course, be appreciated that the longitudinal spacings between the intermediate current electrode 111 and the current electrodes 108 and 112 will determine what proportion of the current output of the current-supply means 102 will pass the measuring electrodes 109 and 110. Thus, if the spacing between the electrodes 108 and 111 is exactly half of the spacing between the electrodes 111 and 112, two-thirds of the current output of the current-supply means 102 will be between the closely-spaced current electrodes and one-third of the current output will be between the widely-spaced current electrodes. A variation in the electrode spacing such as this will, therefore, require only that appropriate changes be made in the circuitry of the measuring means 103 to accurately determine the resistivity of the mud stream flowing through the tube 101 between the measuring electrodes 109 and 110. In short, the unique feature of the resistivity-measuring apparatus 100 is that the entire current output of the current-supply means 102 will be directed along the interior bore 113 of the insulated conduit 101 and the division of this output current between the two paths illustrated in FIG. 3 will be in accordance to the relative spacings between the current electrodes 108, 111 and 112.

It will, of course, be appreciated that there will always be a significant difference between the temperatures of the mud streams respectively entering and leaving the borehole 13. Thus, where the resistivity-measuring apparatus 50 (or 100) of the present invention is employed for measuring the resistivities of the two streams of drilling mud entering and leaving a well bore 13 such as shown in FIG. 1, the two measurements will be at different temperatures; and appropriate corrections must be made before a valid comparison can be made between the resistivity of a given incremental portion of drilling mud as it enters the well bore and the resistivity of that same portion as it subsequently leaves the well bore. A recognized equation for the conversion of the resistivity of a drilling mud at one temperature to the equivalent resistivity thereof at a stated temperature such as 75° F is as follows:

$$R_{75°} = \frac{R_t(t+7°F.)}{75°F.+7°F.} \quad \text{Eq. 5}$$

where, $t =$ is the actual temperature of the drilling mud, °F; and $R_t =$ the measured resistivity at the temperature $t$.

It will be appreciated, therefore, that Equation 5 can be conveniently used to manually convert each resistivity measurement to its equivalent value at 75° F.

Figure 4:
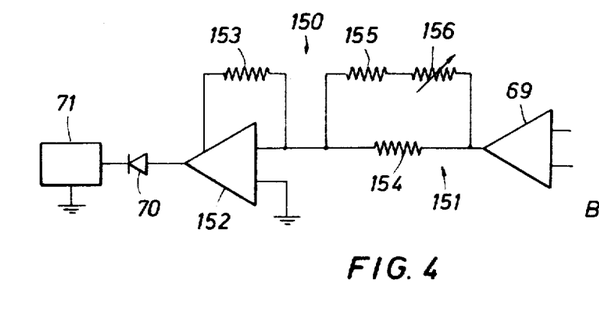
FIG. 4 depicts a modification of the apparatus shown in FIGS. 2 and 3.

As previously mentioned, however, since the new and improved methods and apparatus of the present invention find their greatest utility in determining with precision those changes in the resistivity of the drilling mud which are attributed to the effects of the various formations which are penetrated during a drilling operation, it is of importance to the present invention that appropriate measures be taken to present the resistivity measurements of the two mud streams at a selected common or standard temperature. Thus, in keeping with the objects of the present invention, new and improved circuit means 150 are shown in FIG. 4 for automatically correcting the resistivity measurements obtained by the apparatus 50 or 100 respectively depicted in FIGS. 2 and 3 to a selected standard temperature. As shown in FIG. 4, the output of the amplifier 69 (or the amplifier 105) is coupled to a resistive network 151 in the input circuit of a second amplifier 152 and cooperatively arranged with its feedback resistor 153 for controlling the gain as a function of mud temperature so that the output of the latter amplifier which is, in turn, coupled to the recorder 71 (or the recorder 107) will be a function of the resistivity being measured when corrected to the equivalent resistivity at a selected temperature such as 75° F.

To accomplish this, the resistance network 151 is comprised of a first resistor 154 which is shunted by a second resistor 155 that is serially connected to a thermistor 156. Thus, by mounting the thermistor 156 in the interior bore of the measuring tube 51 (or the tube 101), the resistance of the thermistor will vary in accordance with the actual fluid temperature of the drilling muds flowing at that time through the tube.

The variations in resistance of the thermistor 156 in accordance with changes in temperature is, of course, predictable but it is certainly not a linear response. Thus, once a particular thermistor 156 has been selected and its changes of resistance in response to different temperatures are known, the resistors 153–155 are appropriately selected so that the combined resistance of the resistive network 151 will regulate the gain of the amplifier 152 in accordance with Equation 5.

The gain of the amplifier 152 can, of course, be expressed as:

$$E_{out}/E_{in} = R_{153}/R_{151} \quad \text{Eq. 6}$$

where, $E_{out} =$ output voltage level of amplifier 152;

$E_{in} =$ input voltage level of amplifier 152;

$R_{151} =$ combined resistance of resistive network 151; and $R_{153} =$ resistance of feedback resistor 153.

By virtue of the thermistor 156, it will be recognized, however, that the resistance of the network 151 will vary in accordance with changes in the temperature of the particular mud stream being measured. Thus, once a particular thermistor 156 is selected, the values of the resistors 153–155 are selected so that the gain of the amplifier 152 will be substantially linear in relation to temperature, with the output curve of the amplifier coinciding with several selected points as determined from Equation 5 and very nearly coinciding with the intermediate points on this curve between the selected temperatures. Those skilled in the art will, of course, appreciate that the resistive network 151 can be modified by adding additional thermistors in parallel with the thermistor 156 if it is desired to shape the output curve of the amplifier 152 to fit the linear curve of Equation 5 even more closely than can be obtained with the resistive network as illustrated in FIG. 4.

It will, of course, be appreciated that the output of the recorder 71 (or the recorder 107) can be presented in any convenient form. However, as previously explained, the most-significant purpose of the methods and apparatus of the invention is to provide accurate measurements of differences in the resistivity of incremental portions of a drilling mud entering and subsequently leaving a well bore. Moreover, since more meaningful measurements will be provided where these resistivity measurements are related to the actual depth of the drill bit 21 as each successive incremental portion of the drilling mud passes therethrough, as shown in FIG. 5 it is preferred that the resistivity measurements provided by the present invention be presented as a function of the depth of the well bore at the time that each incremental portion passes through the drill bit.

As previously mentioned, it can be determined with reasonable accuracy how long it takes a given incremental portion of the drilling mud picked up by the mud pump 24 to reach the drill bit 21 and then be returned to the mud pit 30. It will, of course, be recognized that the conventional drilling records which are customarily obtained can be utilized to accurately determine the depth of the well at any given time. Thus, it is quite convenient to arrange the recorders 34 and 35 to respectively plot the resistivity of the drilling mud passing the insulated conduits 32 and 33 as a function of the time when each incremental portion passes through its respective measuring conduit. By appropriately compensating for variations in temperature, these first and second resistivity measurements will, therefore, provide an accurate record of the changes in resistivity which have occurred by the passage of each incremental portion of drilling mud through the measuring tubes 32 and 33.

Once these recordings are obtained, they may be easily correlated with the drilling records to relate the successive resistivity measurements to a common parameter. As previously mentioned, it is preferred to present the two sets of measurements at the depth of the drill bit 21 as each incremental portion of drilling mud reaches the drill bit and enters the borehole 13. Thus, by first determining the time required for an incremental portion of drilling mud to pass between the measuring tube 32 and the drill bit 21 as well as the time for that same incremental portion to return to the measuring conduit 33, the two resistivity records can be readily related to the times at which each incremental portion is passing the drill bit. Then, by correlating these times with typical drilling records showing the times at which the drill bit 21 is at given depths, graphical records can be made of the resistivity measurements versus depth.

Figure 5:
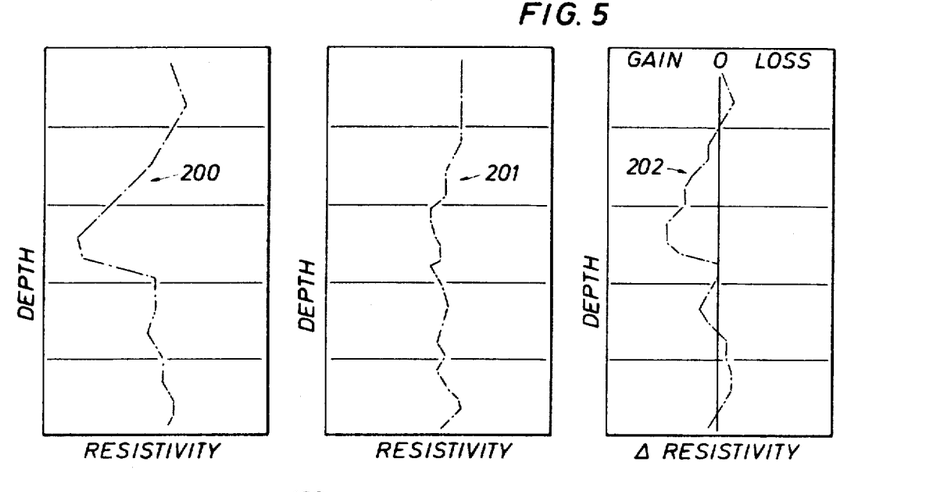
FIG. 5 is a schematic record or log typical of those which may be obtained while practicing the present invention with the apparatus illustrated in either FIG. 2 or FIG. 3.

Thus, as shown in FIG. 5, the continuous resistivity measurements of the mud stream entering the well bore 13 can be represented, as at 200, as a function of the successive depths of the drill bit 21. Similarly, the resistivity of the mud stream leaving the well bore 13 is plotted, as at 201, at the same depth to represent the resistivity of the same incremental portion of the mud stream after it has been affected by whatever borehole conditions the mud has encountered as it leaves the drill bit 21. It will, of course, be recognized that the resistivity records 200 and 201 can be compared to develop a third record, as at 202, of the algebraic difference between the two records for illustrating changes in the resistivity of the drilling mud after it passes through the drill bit 21.

Accordingly, it will be recognized that the methods and apparatus of the present invention provide new and improved techniques and measuring tools for accurately determining the resistivity of a flowing stream of drilling mud without requiring special modifications of a conventional mud-circulating system. In one mode of practicing the present invention, dual measuring electrodes are uniquely arranged to accurately measure the effects of the entire current output of the current source. In the other mode of practicing the present invention, the current electrodes are uniquely arranged to prevent the leakage of any current from the current source out of the electrically-insulated measuring tube. Thus, in either mode, an accurate measurement can be taken of potential differences developed by passing a current of known magnitude through an isolated segment of drilling mud of selected dimensions for determining the precise electrical resistivity of that stream.

While only particular embodiments of the present invention and modes of practicing the invention have been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. Apparatus adapted for measuring the electrical resistivity of drilling muds and comprising: an electrically insulated tubular conduit adapted to be immersed in a flow of drilling mud for dividing the flowing mud into a first stream flowing exteriorly of said conduit and a second stream flowing through the interior bore of said conduit and electrically insulated from said first stream; current-supplying means adapted for dividing a constant electrical current of a known total magnitude into one current fraction of an unknown magnitude passing exteriorly of said conduit through said first stream of drilling mud as well as along one portion of said conduit bore through said second stream of drilling mud and into a remaining current fraction of an unknown magnitude passing exclusively along another portion of said conduit bore through said second stream of drilling mud and consisting solely of a single pair of current electrodes spatially disposed in said conduit bore at opposite ends of said other portion thereof, and constant-current source means adapted for supplying an alternating current of said known total magnitude to said current electrodes; first measuring means exclusively responsive to said one current fraction and including a first pair of measuring electrodes spatially disposed in said one portion of said conduit bore to one side of said current electrodes, and first coupling means operatively coupled to said first pair of measuring electrodes for providing a first signal representative of the potential difference between said first measuring electrodes; second measuring means exclusively responsive to said other current fraction and including a second pair of measuring electrodes spatially disposed in said other portion of said conduit bore between said current electrodes, and second coupling means operatively coupled to said second pair of measuring electrodes for providing a second signal representative of the potential difference between said measuring electrodes; and output means operatively coupled to said first and second coupling means and adapted for combining said first and second signals to provide measurements representative solely of the electrical resistivity of said second stream of drilling mud flowing through said conduit bore in response to the flow of said constant electrical current between said constant-current source means and said current electrodes.

2. The apparatus of claim 1 wherein said conduit bore is cylindrical at least between all of said electrodes.

3. The apparatus of claim 1 wherein the output frequency of said constant-current source means is between 60 to 2,000-cycles/second.

4. The apparatus of claim 1 wherein said output means include: recorder means adapted for recording input signals applied thereto as a function of electrical resistivity, and an amplifier having its output coupled to said recorder means; and wherein said first and second coupling means respectively include first and second transformers operatively coupled between the input of said amplifier and said first and second measuring electrodes for supplying input signals to said amplifier which are representative of the summation of the potential differences respectively developed across said first and second measuring electrodes.

5. The apparatus of claim 4 wherein the spacing between said second and third electrodes is equal to the spacing between said fourth and fifth electrodes so that the summation of said potential differences will be equal to the product of the total current output of said current-source means and the electrical resistance of a drilling mud flowing between said second and third electrodes.

6. The apparatus of claim 4 further comprising: a resistive network including thermally-responsive variable resistance means mounted on said conduit and operatively coupled to the input of said amplifier, and fixed resistance means operatively coupled to said amplifier and said thermally responsive resistance means for selectively regulating the gain of said amplifier in linear correspondence with changes in the temperature of a drilling mud passing said conduit.

7. The apparatus of claim 13 wherein said thermally responsive resistance means are in series with said amplifier input, and said fixed resistance means include a first resistor in series with said thermally responsive means, a second resistor in parallel with said first resistor and said thermally responsive resistance means, and a third resistor coupled to the output and said input of said amplifier, the values of said first, second and third resistors being selected in relation to the characteristics of said thermally responsive resistance means to regulate the gain of said amplifier in accordance with a linear equation converting resistivity at a given temperature to resistivity at a selected constant temperature.

8. Apparatus adapted for measuring the electrical resistivity of drilling muds and comprising: an electrically-insulated tubular conduit adapted to be immersed in a stream of drilling mud for electrically isolating that portion of the stream flowing through the interior bore of said conduit from the remainder of the stream flowing exteriorly of said conduit; six electrodes spatially disposed along said conduit bore; current-source means operatively coupled across the first and fourth ones of said electrodes and adapted for applying thereto an alternating current of a constant amplitude; recorder means adapted for recording input signals applied thereto as a function of electrical resistivity; an amplifier having its output coupled to said recorder means; first and second coupling means respectively coupled between said second and third electrodes and said fifth and sixth electrodes and the input of said amplifier for supplying input signals to said amplifier which are representative of the summation of the potential differences respectively developed across said second and third electrodes and said fifth and sixth electrodes; and temperature-compensating means for selectively regulating the gain of said amplifier response to changes in the temperature of a drilling mud passing said conduit including a resistive network having thermally-responsive variable resistance means mounted on said conduit and operatively coupled in series with the input of said amplifier, and fixed resistance means including a first resistor in series with said thermally-responsive resistance means, a second resistor in parallel with said first resistor and said thermally responsive resistance means, and a third resistor coupled to the output and said input of said amplifier, the values of said first, second and third resistors being selected in relation to the characteristics of said thermally responsive resistance means to regulate the gain of said amplifier in accordance with a linear equation converting resistivity at a given temperature to resistivity at a selected constant temperature.

9. Apparatus adapted for measuring the electrical resistivity of drilling muds and comprising: an electrically-insulated tubular conduit adapted to be immersed in a stream of drilling mud for electrically isolating that portion of the stream flowing through the interior bore of said conduit from the remainder of the stream flowing exteriorly of said conduit; three current-conducting electrodes spatially disposed along said conduit bore; current-source means operatively coupled between the two outwardly disposed ones of said current-conducting electrodes and the intermediate one of said current-conducting electrodes and adapted for applying thereto an alternating current of a constant amplitude; a pair of measuring electrodes spatially disposed along said conduit bore between one of said outwardly-disposed current-conducting electrodes and said intermediate current-conducting electrode; recorder means adapted for recording input signals applied thereto as a function of electrical resistivity; an amplifier having its output coupled to said recorder means; transformer means operatively coupled between the input of said amplifier and said measuring electrodes for supplying input signals to said amplifier which are representative of the potential differences developed across said measuring electrodes in response to the flow of electrical current between said current-source means and said current-conducting electrodes; and temperature-compensating means for selectively regulating the gain of said amplifier in response to changes in the temperature of a drilling mud passing said conduit including a resistive network having thermally responsive variable resistance means mounted on said conduit and operatively coupled in series with the input of said amplifier, and fixed resistance means including a first resistor in series with said thermally responsive resistance means, a second resistor in parallel with said first resistor and said thermally responsive resistance means, and a third resistor coupled to the output of said input of said amplifier, the values of said first, second and third resistors being selected in relation to the characteristics of said thermally responsive resistance means to regulate the gain of said amplifier in accordance with a linear equation converging resistivity at a given temperature to resistivity at a selected constant temperature.

10. The apparatus of claim 9 wherein said conduit bore is cylindrical at least between said outwardly disposed electrodes.

11. The apparatus of claim 9 wherein the output frequency of said current-source means is between 60 and 2,000-cycles/second.

12. The apparatus of claim 9 wherein said intermediate current-conducting electrode is positioned midway between said outwardly disposed current-conducting electrodes so that the current output of said current-source means will be divided equally between said outwardly disposed current-conducting electrodes.

13. A method for measuring the electrical resistivity of a stream of drilling mud comprising the steps of: placing an electrically-insulated tubular conduit into said mud stream for isolating a part thereof within the interior bore of said conduit from the remainder of said mud stream exterior of said conduit; passing a first portion of electrical current directly through a first part of said isolated mud stream between a pair of spaced current electrodes; passing a second portion of electrical current from one of said spaced electrodes in an indirect path looping from one end of said conduit outwardly around the exterior of said conduit and back through a second part of said isolated mud stream between the other end of said conduit and the other one of said spaced electrodes; measuring the potential difference developed across a selected segment of said first part of said isolated mud stream by the passage of said first current portion; measuring the potential difference developed across a selected segment of said second part of said isolated mud stream by the passage of said second current portion; and adding a function of said measured potential differences, respectively, to obtain a characteristic which is representative of the resistivity of said isolated mud stream flowing through said interior bore of said conduit.

14. The method of claim 13 wherein said selected segments are distributed longitudinally along said conduit bore.

15. The method of claim 13 wherein said selected segments are distributed longitudinally along said conduit bore and are of equal lengths so that the summation of said potential differences will be directly proportional to the resistivity of said mud stream.

* * * * *